US012749255B2

(12) United States Patent
Wu

(10) Patent No.: US 12,749,255 B2
(45) Date of Patent: Sep. 29, 2026

(54) VIDEO PROCESSING METHOD AND APPARATUS, DEVICE AND STORAGE MEDIUM

(71) Applicant: Beijing Zitiao Network Technology Co., Ltd., Beijing (CN)

(72) Inventor: Jinyuan Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 234 days.

(21) Appl. No.: 18/687,764

(22) PCT Filed: Aug. 8, 2022

(86) PCT No.: PCT/CN2022/110796
§ 371 (c)(1),
(2) Date: Feb. 28, 2024

(87) PCT Pub. No.: WO2023/029892
PCT Pub. Date: Mar. 9, 2023

(65) Prior Publication Data

US 2024/0355036 A1 Oct. 24, 2024

(30) Foreign Application Priority Data

Aug. 31, 2021 (CN) ......................... 202111016296.2

(51) Int. Cl.
*G06T 15/04* (2011.01)
*G06T 7/40* (2017.01)
*G06V 10/60* (2022.01)

(52) U.S. Cl.
CPC ................ *G06T 15/04* (2013.01); *G06T 7/40* (2013.01); *G06V 10/60* (2022.01)

(58) Field of Classification Search
CPC ........... G06T 15/04; G06T 7/40; G06T 17/00; G06V 10/60; H04N 5/262; H04N 9/74
See application file for complete search history.

(56) References Cited

U.S. PATENT DOCUMENTS 5,687,307 A 11/1997 Akisada et al.
6,999,093 B1 2/2006 Wetzel et al.
(Continued)

FOREIGN PATENT DOCUMENTS

CN 101006471 A 7/2007
CN 102301399 A 12/2011
(Continued)

OTHER PUBLICATIONS

Horn et al. "Determining optical flow", Artificial Intelligence, vol. 17, Issues 1-3, Aug. 1981, pp. 185-203 (Year: 1981).*
(Continued)

*Primary Examiner* — Kee M Tung
*Assistant Examiner* — Xiaoming Wei
(74) *Attorney, Agent, or Firm* — BakerHostetler

(57) ABSTRACT

A video processing method and apparatus, a device, and a storage medium are provided. The method includes: acquiring three-dimensional reconstruction data of a video image and a first texture image corresponding to a current moment; determining target brightness of a target pixel position on the first texture image corresponding to the current moment according to a pre-obtained mapping relationship between pixel positions and initial brightness and brightness change rates; adjusting brightness of the target pixel position on the first texture image to the target brightness so as to obtain a second texture image; and mapping the second texture image onto the video image based on the three-dimensional reconstruction data so as to obtain a target video image.

15 Claims, 3 Drawing Sheets

(56) References Cited

U.S. PATENT DOCUMENTS

| | | | |
|---|---|---|---|
| 2017/0148206 A1 | 5/2017 | Donner et al. | |
| 2018/0012407 A1* | 1/2018 | Chuang | G06T 13/40 |
| 2018/0101966 A1 | 4/2018 | Lee et al. | |
| 2021/0118216 A1 | 4/2021 | Komissarov et al. | |

FOREIGN PATENT DOCUMENTS

| | | |
|---|---|---|
| CN | 106683165 A | 5/2017 |
| CN | 107958480 A | 4/2018 |
| CN | 108470369 A | 8/2018 |
| CN | 108876886 A | 11/2018 |
| CN | 108876921 A | 11/2018 |
| CN | 109410302 A | 3/2019 |
| CN | 111476861 A | 7/2020 |
| CN | 111681307 A | 9/2020 |
| CN | 112288848 A | 1/2021 |
| CN | 115733938 B | 2/2025 |
| JP | H10-283487 A | 10/1998 |
| WO | WO 2020/182880 A1 | 9/2020 |

OTHER PUBLICATIONS

Bellini et al. "Time-varying Weathering in Texture Space", ACM Trans. Graph. 35, 4, Article 141 (Jul. 2016), 11 pages. https://doi.org/10.1145/2897824.2925891 (Year: 2016).*

Kwatra et al. "Texturing Fluids", Proc. IEEE Transactions on Visualization and Computer Graphics (TVCG), Sep. 2007 (Year: 2007).*

Fabrice Neyret, "Advected Textures", Eurographics/SIGGRAPH Symposium on Computer Animation (2003), (Year: 2003).*

Pan Yinfei et al.; "Realistic Texture Mapping Using Vector Operation for Image Synthesis"; Journal of Computer-Aided Design & Computer Graphics; vol. 17 No. 2; Feb. 2005; p. 305-312 (contains English Abstract).

China Patent Application No. 202111016296.2; Notification to Grant; dated Dec. 20, 2024; 6 pages.

International Patent Application No. PCT/CN2022/110796; Int'l Written Opinion and Search Report; dated Nov. 11, 2022; 7 pages.

China Patent Application No. 202111016296.2; Office Action; dated Jan. 5, 2024; 12 pages.

* cited by examiner

VIDEO PROCESSING METHOD AND APPARATUS, DEVICE AND STORAGE MEDIUM

CROSS-REFERENCE TO RELATED APPLICATION

This application is the U.S. National Stage of International Application No. PCT/CN2022/110796, filed on Aug. 9, 2022, which claims the priority of Chinese patent application No. 202111016296.2, entitled "video processing method and apparatus, device, and storage medium" filed on Aug. 31, 2021, are incorporated herein by reference in their entireties.

TECHNICAL FIELD

The embodiments of the present disclosure relate to the technical field of video processing, and in particular to a video processing method and apparatus, a device, and a storage medium.

BACKGROUND

A video application provided by the related art may shoot a video of a real scene and share the video of the real scene on a video consumption platform for a consumer to watch. However, with the development of video applications, the sharing of the real scene cannot meet the increasing user requirements. Therefore, how to add texture effects with specific effects to video scenes to improve the interestingness of videos is a technical problem that needs to be solved urgently.

SUMMARY

To solve the above technical problems or at least partially solve the above technical problems, embodiments of the present disclosure provide a video processing method and apparatus, a device, and a storage medium.

A first aspect of embodiments of the present disclosure provides a video processing method including:

- acquiring three-dimensional reconstruction data of a video image and a first texture image corresponding to a current moment;
- determining target brightness of a target pixel position on the first texture image corresponding to the current moment according to a pre-obtained mapping relationship between pixel positions and initial brightness and brightness change rates;
- adjusting brightness of the target pixel position on the first texture image to the target brightness so as to obtain a second texture image; and
- mapping the second texture image onto the video image based on the three-dimensional reconstruction data so as to obtain a target video image.

A second aspect of embodiments of the present disclosure provides a video processing apparatus including:

- an acquisition module, configured to acquire three-dimensional reconstruction data of a current video image and a first texture image corresponding to a current moment;
- a determination module, configured to determine target brightness of a target pixel position on the first texture image corresponding to the current moment according to a pre-obtained mapping relationship between pixel positions and initial brightness and brightness change rates;
- a brightness adjustment module, configured to adjust brightness of the target pixel position on the first texture image to the target brightness so as to obtain a second texture image; and
- a texture mapping module, configured to map the second texture image onto the video image based on the three-dimensional reconstruction data so as to obtain a target video image.

A third aspect of embodiments of the present disclosure provides an electronic device including:

- a processor and a memory having stored therein a computer program which, when executed by the processor, implements the method in the above-mentioned first aspect.

A fourth aspect of embodiments of the present disclosure provides a computer-readable storage medium having stored therein a computer program which, when executed by a processor, implements the method in the above-mentioned first aspect.

A fifth aspect of embodiments of the present disclosure provides a computer program product, including a computer program carried on a non-transitory computer-readable medium, the computer program including a program code for executing the method in the above-mentioned first aspect.

BRIEF DESCRIPTION OF DRAWINGS

The accompanying drawings, which are incorporated in and constitute a part of this description, illustrate embodiments consistent with the present disclosure and, together with the description, explain the principles of the present disclosure.

To more clearly illustrate the embodiments of the present disclosure or technical solutions in the related art, the drawings required for the embodiments or the related art will be briefly described below, and it is obvious for those skilled in the art to obtain other drawings without inventive labor.

DETAILED DESCRIPTION

To enable a clearer understanding of the above purposes, features and advantages of the present disclosure, the embodiments of the present disclosure will be further described below. It should be noted that embodiments and features in embodiments of the present disclosure may be combined with each other without conflict.

Many specific details are set forth in the following description to facilitate a full understanding of the present disclosure, but the present disclosure may also be implemented in other ways different from those described herein; obviously, the embodiments in the specification are only a part of the embodiments of the present disclosure and not all the embodiments.

In the related art, a video application may shoot a video of a real scene and share the video of the real scene on a video consumption platform for a consumer to watch.

With the development of video applications, the sharing of the real scene cannot meet the increasing user requirements. Users hope to add texture effects with specific effects to video scenes to improve the interestingness of videos and further meet the increasing user requirements.

To meet the user requirements, embodiments of the present disclosure provide a video processing method which can add textures with a flowing and flicking effect to a video image.

The video processing method provided by the embodiment of the present disclosure will be described below in combination with an exemplary embodiment.

Figure 1:
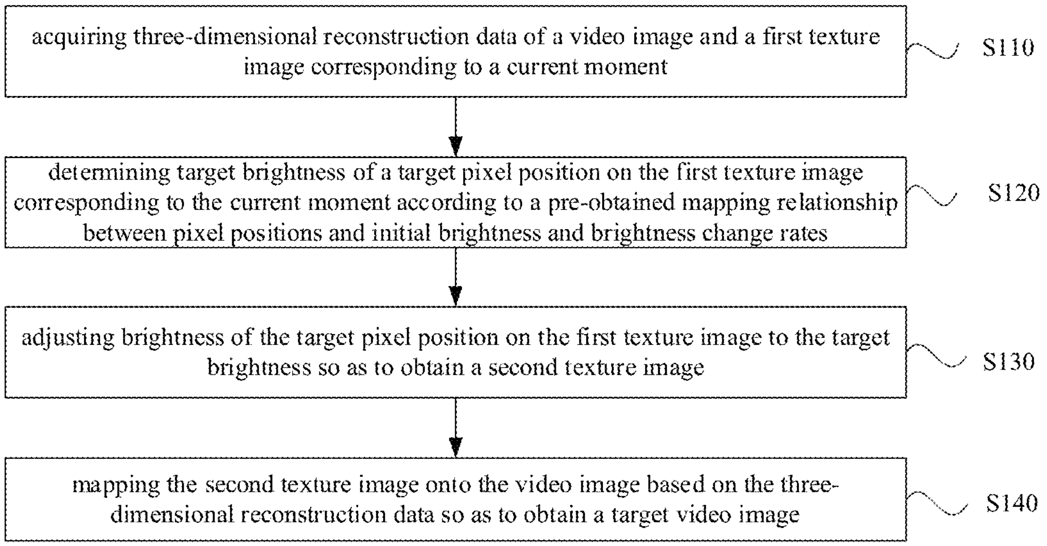
FIG. 1 is a flow diagram of a video processing method provided by an embodiment of the present disclosure.

FIG. 1 shows a flow diagram of a video processing method provided by an embodiment of the present disclosure.

In some embodiments of the present disclosure, the video processing method shown in FIG. 1 may be performed by an electronic device. The electronic device may include a mobile phone, a tablet computer, a desktop computer, a notebook computer, a vehicle-mounted terminal, a wearable device, an all-in-one machine, a smart home device and other devices with video processing functions, and may also include a virtual machine or a simulator-simulated device.

As shown in FIG. 1, the video processing method may include the following S110-S140.

S110: acquiring three-dimensional reconstruction data of a video image and a first texture image corresponding to a current moment.

Specifically, before acquiring the three-dimensional reconstruction data of the video image and the first texture image, a shooting device may be used to acquire, from different angles, a scene that requires adding special effects to obtain a scene video of the scene, and send the scene video to the electronic device; after the electronic device obtains the scene video, a scene reconstruction is performed based on the video image in the scene video to obtain three-dimensional reconstruction data of the video image in the scene video.

In one possible implementation, the above-mentioned shooting device may include a three-dimensional scanner, a video camera, a laser, a depth camera, etc., which is not limited here.

In one possible implementation, the video image may include a game video image, a virtual reality image, an audio-visual video image, etc., which is not limited here.

In an embodiment of the present disclosure, the first texture image may be an initial material image for adding a special effect to a video image, and a texture and brightness of each pixel position are defined in the first texture image. In an embodiment of the present disclosure, the first texture images corresponding to different moments may be different, and the first texture images in the embodiments of the present disclosure may be generated in real time or preset.

In one possible implementation, the first texture image may be a text image, a landscape image, an architectural image or other types of images, which is not limited here.

S120: determining target brightness of a target pixel position on the first texture image corresponding to the current moment according to a pre-obtained mapping relationship between pixel positions and initial brightness and brightness change rates.

The pixel position in the embodiment of the present disclosure may be understood as one coordinate region or a coordinate point.

According to the embodiments of the present disclosure, the initial brightness and the brightness change rate of each pixel position are preset, wherein the initial brightness corresponding to different pixel positions may be the same or different, and the brightness change rates corresponding to different pixel positions may be the same or different.

The target pixel position in the embodiment of the present disclosure may be understood as a pixel point position where a brightness value needs to be changed. The number of the target pixel positions in the embodiment of the present disclosure may be one or plural.

The target brightness of the target pixel position may be understood as brightness of the target pixel position, which changes from the initial brightness at an initial moment to a brightness value obtained at the current moment at a preset brightness change rate.

In one exemplary implementation of the embodiment of the present disclosure, S120 may include the following S1-S3.

S1: acquiring initial brightness and a brightness change rate of the target pixel position according to the pre-obtained mapping relationship between the pixel positions and initial brightness and brightness change rates.

S2: determining a brightness variation of the target pixel position corresponding to the current moment based on a time parameter at the current moment and the brightness change rate of the target pixel position.

S3: determining the target brightness of the target pixel position corresponding to the current moment based on the brightness variation of the target pixel position corresponding to the current moment and the initial brightness of the target pixel position.

In the embodiments of the present disclosure, the brightness of each pixel position may be configured to change periodically within a preset range (such as a range of 0 to 1, but not limited to the range of 0 to 1).

In one implementation of the embodiment of the present disclosure, the time parameter of the current moment may be understood as a time variation of the current moment in a current change period.

In one possible implementation, a calculation formula of the target brightness may be:

$$Z = f_{xy}(t \times v + a)$$

Where, Z is target brightness of a target pixel position, x is an abscissa of the target pixel position, y is an ordinate of the target pixel position, t is a time parameter of a current moment, v is a brightness change rate of the target pixel position, a is initial brightness of the target pixel position, and $f_{xy}(*)$ is a calculation function of the target brightness.

a and v may be preset values.

Thus, the initial brightness and the brightness change rate of the target pixel position may be obtained according to the pre-obtained mapping relationship between the pixel positions and the initial brightness and the brightness change rates, and the time parameter at the current moment is multiplied by the brightness change rate of the target pixel position to obtain the brightness variation of the target pixel position corresponding to the current moment, and then the target brightness of the target pixel position corresponding to the current moment may be accurately determined based on the brightness variation of the target pixel position corresponding to the current moment and the initial brightness of the target pixel position.

S130: adjusting brightness of the target pixel position on the first texture image to the target brightness so as to obtain a second texture image.

Specifically, after the electronic device determines the target brightness of the target pixel position on the first texture image corresponding to the current moment, the brightness of the target pixel position may be adjusted to the target brightness to change a brightness value of a pixel point at the target pixel position, so that the target pixel position corresponds to different brightness values at different moments.

S140: mapping the second texture image onto the video image based on the three-dimensional reconstruction data so as to obtain a target video image.

In the embodiments of the present disclosure, the three-dimensional reconstruction data includes data of a three-dimensional mesh that constitutes a three-dimensional model of the scene, and the data of the three-dimensional mesh includes vertex coordinates and a normal direction.

The three-dimensional mesh may be understood as a basic unit constituting the three-dimensional model of the scene.

In an exemplary implementation of the embodiments of the present disclosure, the vertex coordinates and the normal direction of the three-dimensional mesh may be extracted from the three-dimensional reconstruction data of the scene through a vertex shader.

In the embodiment of the present disclosure, texture mapping may be understood as a process of mapping the texture on the texture image onto the three-dimensional model of the scene.

In an exemplary implementation of the embodiments of the present disclosure, firstly, sampling coordinates may be determined based on vertex coordinates and a normal direction in data of a three-dimensional mesh; then a preset second texture image is sampled based on the sampling coordinates; and based on an association relationship between the sampling coordinates and the vertex, the sampled second texture image is mapped onto a video image to obtain a target video image.

Specifically, since the sampling coordinates are determined based on the three-dimensional coordinates and the normal direction of the mesh, after sampling the texture image based on the sampling coordinates, the sampled second texture image may be mapped onto the video image based on the association relationship between the sampling coordinates and the mesh, such that the captured texture image may be mapped onto a three-dimensional scene of a video.

In the embodiments of the present disclosure, after acquiring three-dimensional reconstruction data of a video image and a first texture image corresponding to a current moment, target brightness of a target pixel position on the first texture image corresponding to the current moment may be determined according to a pre-obtained mapping relationship between pixel positions and initial brightness and brightness change rates, brightness of the target pixel position on the first texture image is adjusted to the target brightness so as to obtain a second texture image, and the second texture image is mapped onto the video image so as to obtain a target video image. According to the solutions provided by the embodiments of the present disclosure, the same pixel position on the video image may show different textures and brightness at different moments, and different pixel positions on the video image may show different textures and brightness at the same moment, thereby implementing a flowing and flickering texture effect on the video image, and improving the interestingness of the video.

In another embodiment of the present disclosure, a texture on a pre-obtained reference texture image may be randomly sampled onto at least a portion of pixel positions of a preset template so as to obtain the first texture image corresponding to the current moment.

The pre-obtained reference texture image may be a texture image to be sampled.

The preset template may be a sampling template obtained by dividing pixels in a screen of the electronic device into a plurality of uniform blocks in advance.

A size of each pixel position in the preset template may be a fixed size, so that when the texture data in the reference texture image is sampled onto the pixel position of the preset template, the deformation of texture data in the pixel position of the preset template is avoided.

In some embodiments, the randomly sampling a texture on the pre-obtained reference texture image onto at least a portion of pixel positions of the preset template may include the following S10-S14.

S10: randomly selecting, for any pixel position of the at least a portion of pixel positions of the preset template, one pixel position from a pre-obtained noise texture image as a sampling position, the noise texture image comprising information of random coordinates corresponding to the sampling position.

S12: extracting the random coordinates corresponding to the sampling position from the noise texture image.

S14: sampling a texture at a position in the reference texture image corresponding to the random coordinates onto the any pixel position.

The random coordinate may be one randomly generated coordinate.

S14 may include: by taking the random coordinates as sampling coordinates, sampling a texture at a position in the reference texture image corresponding to the random coordinates onto a preset template.

Specifically, after the electronic device acquires the reference texture image, the pre-obtained noise texture image and the preset template, for any pixel position of at least a portion of pixel positions of the preset template, one pixel position is selected from the pre-obtained noise texture image as a sampling position, random coordinates of the sampling position are determined, and by taking the random coordinates as sampling coordinates, a texture at a position in the reference texture image corresponding to the random coordinates is sampled onto the preset template until all the sampling is completed, so as to obtain the first texture image corresponding to the current moment.

Figure 2A:
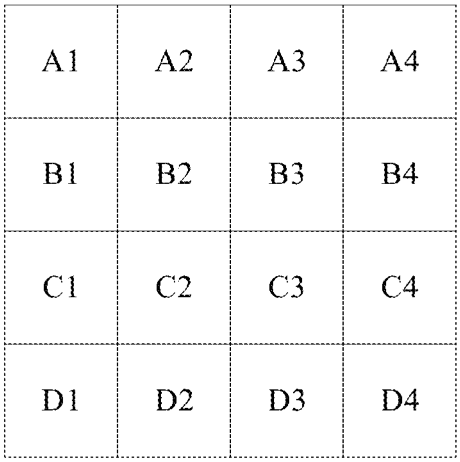
FIG. 2*a* is a schematic diagram of a reference texture image provided by an embodiment of the present disclosure.
Figure 2B:
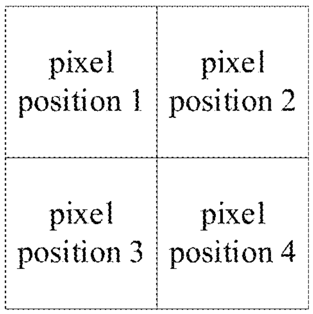
FIG. 2*b* is a schematic diagram of a preset template provided by an embodiment of the present disclosure.
Figure 2C:
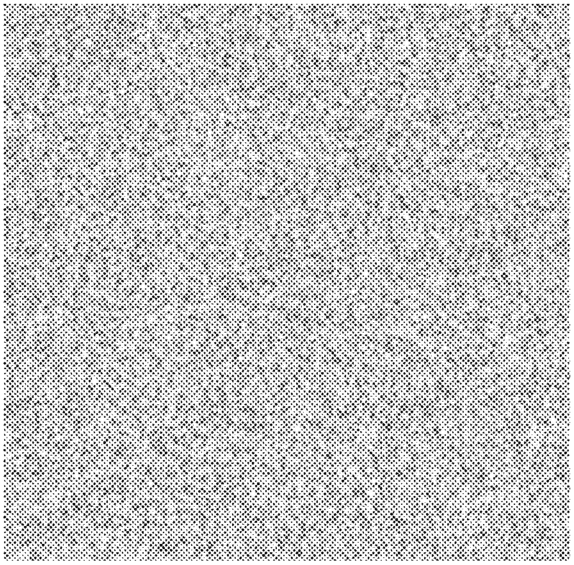
FIG. 2*c* is a schematic diagram of a noise texture image provided by an embodiment of the present disclosure.

FIG. 2*a* shows a schematic diagram of a reference texture image provided by an embodiment of the present disclosure, FIG. 2*b* shows a preset template provided by an embodiment of the present disclosure, and FIG. 2*c* shows a schematic diagram of a noise texture image provided by an embodiment of the present disclosure.

The reference texture image shown in FIG. 2*a* may be a text image. Each small square of the preset template shown in FIG. 2*b* is a pixel position. Each sampling position in the noise texture image shown in FIG. 2*c* corresponds to one or more random coordinates.

With reference to FIG. 2*a*-FIG. 2*c*, for a pixel position 1 and a pixel position 2 in at least a portion of pixel positions of the preset template, the pixel position 1 corresponding to a texture A4 and the pixel position 2 corresponding to a texture A3 at a last moment before a current moment, the electronic device randomly selects, at the current moment, one pixel position from the noise texture image as a sampling position, determines random coordinates of the sampling position, and by taking the random coordinates as sampling coordinates, samples a texture A1 at a position in the reference texture image corresponding to the random coordinates onto the pixel position 1 such that a texture of the pixel position 1 is adjusted from A4 to A1, and samples a texture A2 at a position in the reference texture image corresponding to the random coordinates onto the pixel position 2 such that a texture of the pixel position 2 is adjusted from A3 to A2, so as to obtain a first texture image corresponding to the current moment.

Thus, in the embodiment of the present disclosure, the noise texture image may be introduced, the random coordinates corresponding to the sampling position may be extracted from the noise texture image; based on the random coordinates, the texture on the pre-obtained reference texture image may be randomly sampled onto at least a portion of pixel positions of the preset template to obtain the first texture image corresponding to the current moment; the texture information of the first texture image captured in a continuous period of time may be continuously changed, to present a texture dynamic change effect.

In other embodiments, the randomly sampling the texture on the pre-obtained reference texture image onto at least a portion of pixel positions of the preset template may include the following S20-S24.

- S20: performing, for any pixel position of the at least a portion of pixel positions of the preset template, coordinate offset processing on coordinates of the any pixel position on the preset template so as to obtain offset coordinates corresponding to the any pixel position.
- S22: acquiring random coordinates at a corresponding position from a preset noise texture image based on the offset coordinates.
- S24: capturing a texture at a position in the reference texture image corresponding to the random coordinates onto the any pixel position.

The offset coordinates may be coordinates obtained after coordinate offset processing is performed on initial coordinates corresponding to the pixel position, and the offset processing may be, for example, superimposition of the initial coordinates and time parameters corresponding to the current moment, but is not limited to the superimposition of the initial coordinates and the time parameters corresponding to the current moment.

Specifically, after the electronic device acquires the reference texture image, the pre-obtained noise texture image and the preset template, for any pixel position of the at least a portion of pixel positions of the preset template, the electronic device performs coordinate offset processing on coordinates of the any pixel position on the preset template, obtains offset coordinates corresponding to the any pixel position according to initial coordinates of the any pixel position, then, by taking a position corresponding to the offset coordinates as a sampling position in a preset noise texture image, determines random coordinates corresponding to the sampling position, and further, by taking the random coordinates as sampling coordinates, samples a texture at a position in the reference texture image corresponding to the random coordinates onto the any pixel position, so as to obtain a first texture image corresponding to the current moment.

Thus, in the embodiments of the present disclosure, the time parameters may be introduced, for any pixel position of at least a portion of pixel positions of the preset template, coordinate offset processing is performed on coordinates of the any pixel position on the preset template to obtain the offset coordinates corresponding to the any pixel position, and a noise texture image may be introduced to obtain the first texture image corresponding to the current moment based on the offset position and the noise texture image, and the texture information of the first texture image captured in a continuous period of time may be continuously changed, so as to present a texture dynamic change effect.

In still other embodiments, the randomly sampling a texture on the pre-obtained reference texture image onto at least a portion of pixel positions of a preset template may include the following S30-S32.

- S30: performing, for any pixel position of the at least a portion of pixel positions of the preset template, coordinate offset processing on coordinates of the any pixel position on the preset template so as to obtain offset coordinates corresponding to the any pixel position.
- S32: capturing a texture at a position in the reference texture image corresponding to the random coordinates onto the any pixel position.

Specifically, after the electronic device acquires the reference texture image and the preset template, for any pixel position of the at least a portion of pixel positions of the preset template, the electronic device performs coordinate offset processing on coordinates of the any pixel position on the preset template, obtains offset coordinates corresponding to the any pixel position according to initial coordinates of the any pixel position, then, by taking the offset coordinates as sampling coordinates, samples a texture at a position in the reference texture image corresponding to the offset coordinates onto the any pixel position, so as to obtain a first texture image corresponding to the current moment.

According to the embodiments of the present disclosure, the second texture image is obtained by adjusting the brightness of the first texture image obtained in the above-mentioned manner, and the second texture image is mapped onto a three-dimensional scene, such that the three-dimensional scene can present a dynamic change effect composed of a brightness change effect and a texture change effect, such as an effect of generating character rain composed of a texture flicking effect and a flowing effect, thereby improving the interestingness of the video.

In another embodiment of the present disclosure, vertex coordinate information and normal direction information of a three-dimensional mesh in three-dimensional reconstruction data of a video image may be processed to obtain three-dimensional coordinates and a normal direction of a fragment in the three-dimensional mesh, the second texture image may be sampled according to the three-dimensional coordinates and the normal direction of the fragment, and the texture, which is sampled, may be further mapped onto the fragment to obtain a target video image.

Figure 3:
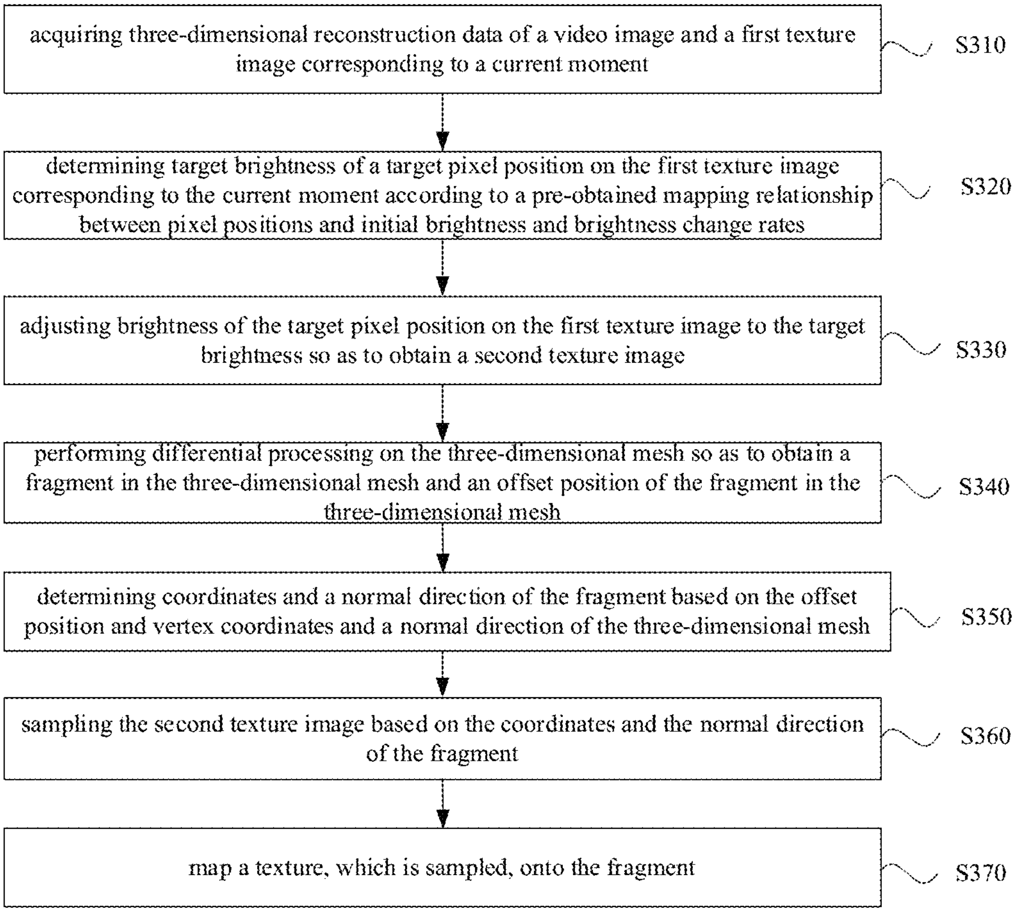
FIG. 3 is a flow diagram of another video processing method provided by an embodiment of the present disclosure.

FIG. 3 shows a flow diagram of another video processing method provided by an embodiment of the present disclosure.

As shown in FIG. 1, the video processing method may include the following S310-S370.

S310: acquiring three-dimensional reconstruction data of a video image and a first texture image corresponding to a current moment.

S320: determining target brightness of a target pixel position on the first texture image corresponding to the current moment according to a pre-obtained mapping relationship between pixel positions and initial brightness and brightness change rates.

S330: adjusting brightness of the target pixel position on the first texture image to the target brightness so as to obtain a second texture image.

S310-S330 are similar to S110-S130, which are omitted here.

S340: performing differential processing on the three-dimensional mesh so as to obtain a fragment in the three-dimensional mesh and an offset position of the fragment in the three-dimensional mesh.

In the embodiments of the present disclosure, the differential processing may be discretizing the three-dimensional mesh according to a preset step size by using an interpolation function and based on the vertex of the three-dimensional mesh, such that the three-dimensional mesh is discretized into one or more fragments.

In the embodiments of the present disclosure, the fragment refers to a smallest unit obtained by dividing the three-dimensional mesh at the same proportion.

The offset position of the fragment relative to the vertex of the three-dimensional mesh may be determined according to a step size of the fragment relative to the vertex of the three-dimensional mesh and a position of the vertex.

Specifically, after the electronic device extracts vertex three-dimensional coordinates and a vertex normal direction of the three-dimensional mesh from the three-dimensional reconstruction data, the electronic device may input the extracted vertex three-dimensional coordinates and vertex normal direction into the fragment shader, and the fragment shader may discretize the three-dimensional mesh according to the vertex of the three-dimensional mesh and the preset step size by using an interpolation function based on a finite difference method, such that the three-dimensional mesh is discretized into one or more fragments, to obtain the fragments in the three-dimensional mesh and offset positions of the fragments in the three-dimensional mesh.

S350: determining coordinates and a normal direction of the fragment based on the offset position and vertex coordinates and a normal direction of the three-dimensional mesh.

In the embodiments of the present disclosure, S350 may include: for each fragment, calculating coordinates of each fragment according to vertex three-dimensional coordinates of the three-dimensional mesh and the offset position of each fragment in the three-dimensional mesh, constructing a normal of each fragment according to the coordinates of the fragment, and taking the normal direction of the three-dimensional mesh as the normal direction of each fragment.

Specifically, after the electronic device obtains the fragments in the three-dimensional mesh and offset positions of the fragments in the three-dimensional mesh, the electronic device may use the fragment shader to take the coordinates corresponding to the offset position of each fragment in the three-dimensional mesh as the coordinates of the fragment, construct the normal of the fragment according to the coordinates of the fragment, and take the normal direction of the three-dimensional mesh as the normal direction of each fragment.

Thus, in the embodiments of the present disclosure, after the second texture image is obtained, the fragment shader is used to perform differential processing on the three-dimensional mesh to obtain the fragment in the three-dimensional mesh and the offset position of the fragment in the three-dimensional mesh, and then the coordinates and the normal direction of the fragment are accurately determined based on the offset position and the vertex coordinates and the normal direction of the three-dimensional mesh.

S360: sampling the second texture image based on the coordinates and the normal direction of the fragment.

In embodiments of the present disclosure, in one possible implementation, S360 may include the following S11-S15.

S11, based on the coordinates and the normal direction of the fragment, determining a distance relationship between the normal of the fragment and three coordinate axes in a preset three-dimensional coordinate system.

S13: in a case where a distance between the normal and a first coordinate axis among the three coordinate axes is the shortest, forming sampling coordinates based on components of three-dimensional coordinates on a second coordinate axis and a third coordinate axis among the three coordinate axes; or, in a case where a distance between the normal and the first and second coordinate axes is the shortest, forming sampling coordinates based on components of three-dimensional coordinates on the second coordinate axis and the third coordinate axis or components of three-dimensional coordinates on the first coordinate axis and the third coordinate axis.

A distance between the normal and the first and second coordinate axes being the shortest means that a distance between the normal and the first coordinate axes, and a distance between the normal and the second coordinate axes are the same and smaller than a distance between the normal and the third coordinate axis.

S15: sampling the second texture image based on the sampling coordinates.

In some embodiments, S11 may include the following S111-S115.

S111: normalizing a normal length of the fragment to obtain a target normal.

S113: determining components of the target normal on the three coordinate axes based on the three-dimensional coordinates and the normal direction of the fragment.

S115: determining a distance relationship between the target normal and the three coordinate axes based on the components of the target normal on the three coordinate axes.

The distance between the target normal and each coordinate axis is inversely proportional to the component of the target normal on the coordinate axis.

In other embodiments, S11 may include the following S211-S213.

S211: according to the three-dimensional coordinates and the normal direction of the fragment, calculating an included angle between the normal of the fragment and each of straight lines where the three coordinate axes of the preset three-dimensional coordinate system are located.

S213: taking the coordinate axis corresponding to a minimum included angle as the first coordinate axis which is closest to the normal of the fragment, and taking the coordinate axis corresponding to a maximum included angle and a second largest included angle as the second coordinate axis and the third coordinate axis which are not closest to the normal of the fragment, wherein the included angles may be any acute angle less than 90.

The preset three-dimensional coordinate system may be the three-dimensional coordinate system where the three-dimensional mesh model to which the fragment belongs is located.

The included angle between the normal of the fragment and each of the straight lines where the three coordinate axes are located may be used to characterize the closing degree between the normal and each of the three coordinate axes.

It can be understood that the greater the included angle between the normal of the fragment and the straight line where the coordinate axis is located, the farther away the normal of the fragment is from the coordinate axis, and thus the greater the distance between the normal of the fragment and the coordinate axis; conversely, the smaller the included angle between the normal of the fragment and the straight line where the coordinate axis is located, the closer the normal of the fragment is to the coordinate axis, and thus the smaller the distance between the normal of the fragment and the coordinate axis.

Thus, in the embodiments of the present disclosure, the distance relationship between the target normal and the three coordinate axes may be determined according to the three-dimensional coordinates of the fragment and the normalized components of the target normal on the three coordinate axes, or the distance relationship between the target normal and the three coordinate axes may be determined according to the included angle between the normal of the fragment and each of the coordinate axes, thereby facilitating determining the sampling coordinates according to the distance relationship later.

In addition, in S13 above, the components of the three-dimensional coordinates on the second coordinate axis and the third coordinate axis among the three coordinate axes may be understood as coordinates of three-dimensional coordinates on the second coordinate axis and the third coordinate axis among the three coordinate axes. Similarly, the components of the three-dimensional coordinates on the second coordinate axis and the third coordinate axis may be understood as coordinates of the three-dimensional coordinates on the second coordinate axis and the third coordinate axis, and the components of the three-dimensional coordinates on the first coordinate axis and the third coordinate axis may be understood as coordinates of the three-dimensional coordinates on the first coordinate axis and the third coordinate axis.

In addition, in S15, the electronic device may sample texture information of a pixel point at a position corresponding to the sampling coordinates on the texture image based on the sampling coordinates, so as to obtain a corresponding texture.

S370, map a texture, which is sampled, onto the fragment.

In the embodiments of the present disclosure, texture mapping may be understood as a process of mapping the texture on the texture image onto the three-dimensional model of the scene.

In the embodiments of the present disclosure, S370 may include S3701.

S3701, in a case where a distance between a normal and a first coordinate axis in the preset three-dimensional coordinate system is the shortest, map the texture, which is sampled, onto the fragment along a direction of the first coordinate axis.

Specifically, since the sampling coordinates are determined based on the three-dimensional coordinates and the normal direction of the fragment, after sampling the texture image based on the sampling coordinates, when it is determined that a distance between the normal and the first coordinate axis in the preset three-dimensional coordinate system is the shortest according to the distance between the normal and the coordinate axis in the preset three-dimensional coordinate system, the texture image, which is sampled, may be mapped onto the fragment along the direction of the first coordinate axis closest to the normal, such that the captured texture image is mapped onto the three-dimensional scene of the video.

In one possible implementation, the texture information sampled in the second texture image may be mapped onto the video image by using a tri-planar mapping mode or a common mapping mode, such that the second texture image may be mapped onto the three-dimensional model of the scene.

Thus, in the embodiments of the present disclosure, due to the fact that the three-dimensional coordinates and the normal direction of the fragment are considered by the embodiments of the present disclosure when determining the sampling coordinates, the texture image captured based on the sampling coordinates may be fitted to the three-dimensional scene of the video after being mapped onto the three-dimensional scene of the video, and presents a natural and realistic effect, thereby improving the interestingness of the video.

Figure 4:
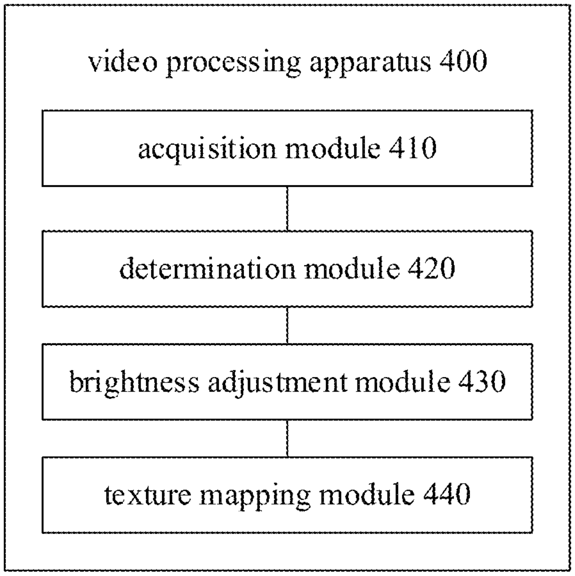
FIG. 4 is a schematic structural diagram of a video processing apparatus provided by an embodiment of the present disclosure.

FIG. 4 is a schematic structural diagram of a video processing apparatus provided by an embodiment of the present disclosure, and the processing apparatus may be understood as the electronic device or a part of functional modules in the electronic device. As shown in FIG. 4, the video processing apparatus 400 may include: an acquisition module 410, a determination module 420, a brightness adjustment module 430 and a texture mapping module 440.

The acquisition module 410 is configured to acquire three-dimensional reconstruction data of a current video image and a first texture image corresponding to a current moment.

The determination module 420 is configured to determine target brightness of a target pixel position on the first texture image corresponding to the current moment according to a pre-obtained mapping relationship between pixel positions and initial brightness and brightness change rates.

The brightness adjustment module 430 is configured to adjust brightness of the target pixel position on the first texture image to the target brightness so as to obtain a second texture image.

The texture mapping module 440 is configured to map the second texture image onto the video image based on the three-dimensional reconstruction data so as to obtain a target video image.

In one possible implementation, the determination module 420 includes:

- an acquisition sub-module, configured to acquire initial brightness and a brightness change rate of the target pixel position according to the pre-obtained mapping relationship between the pixel positions and initial brightness and brightness change rates;
- a first determination sub-module configured to determine a brightness variation of the target pixel position corresponding to the current moment based on a time parameter at the current moment and the brightness change rate of the target pixel position; and
- a second determination sub-module, configured to determine the target brightness of the target pixel position corresponding to the current moment based on the brightness variation of the target pixel position corresponding to the current moment and the initial brightness of the target pixel position.

In one possible implementation, the acquisition module 410 includes:

a random sampling sub-module, configured to randomly sample, for the current moment, a texture on a pre-obtained reference texture image onto at least a portion of pixel positions of a preset template so as to obtain the first texture image corresponding to the current moment.

In one possible implementation, the random sampling sub-module includes:

a selection sub-unit, configured to randomly select, for any pixel position of the at least a portion of pixel positions, one pixel position from a pre-obtained noise texture image as a target pixel position, the noise texture image including information of random coordinates corresponding to the target pixel position;

an extraction sub-unit, configured to extract the random coordinates corresponding to the target pixel position from the noise texture image; and a first sampling sub-unit, configured to sample a texture in the reference texture image corresponding to the random coordinates onto the any pixel position.

In one possible implementation, the random sampling sub-module includes:

a processing sub-unit, configured to perform, for any pixel position of the at least a portion of pixel positions, coordinate offset processing on coordinates of the any pixel position on the preset template so as to obtain offset coordinates corresponding to the any pixel position;

an acquisition sub-unit, configured to acquire random coordinates corresponding to the target pixel position from a preset noise texture image based on the offset coordinates, wherein position coordinates of the target pixel position in the noise texture image are matched with the offset coordinates; and a second sampling sub-unit, configured to capture a texture in the reference texture image corresponding to the random coordinates onto the any pixel position.

In one possible implementation, the three-dimensional reconstruction data includes vertex coordinate information and normal direction information of the three-dimensional mesh.

The texture mapping module 440 includes:

a differential processing module, configured to perform differential processing on the three-dimensional mesh so as to obtain a fragment in the three-dimensional mesh and an offset position of the fragment in the three-dimensional mesh;

a third determination module, configured to determine coordinates and a normal direction of the fragment based on the offset position and vertex coordinates and a normal direction of the three-dimensional mesh;

an image sampling module, configured to sample the second texture image based on the coordinates and the normal direction of the fragment; and a texture mapping sub-module, configured to map a texture, which is sampled, onto the fragment.

In one possible implementation, the texture mapping sub-module is configured to:

in a case where a distance between a normal and a first coordinate axis in a preset three-dimensional coordinate system is the shortest, map the texture, which is sampled, onto the fragment along a direction of the first coordinate axis.

The apparatus provided by the embodiments can execute the method of any of the above-mentioned embodiments in FIG. 1-FIG. 3, and the execution manner and the beneficial effects are similar, which are omitted here.

An embodiment of the present disclosure also provides an electronic device, including a processor and a memory having stored therein a computer program, the computer program, when executed by the processor, implementing the method of any of the above-mentioned embodiments such as shown in FIG. 1, FIG. 3, and FIG. 2*a*-FIG. 2*c*.

Figure 5:
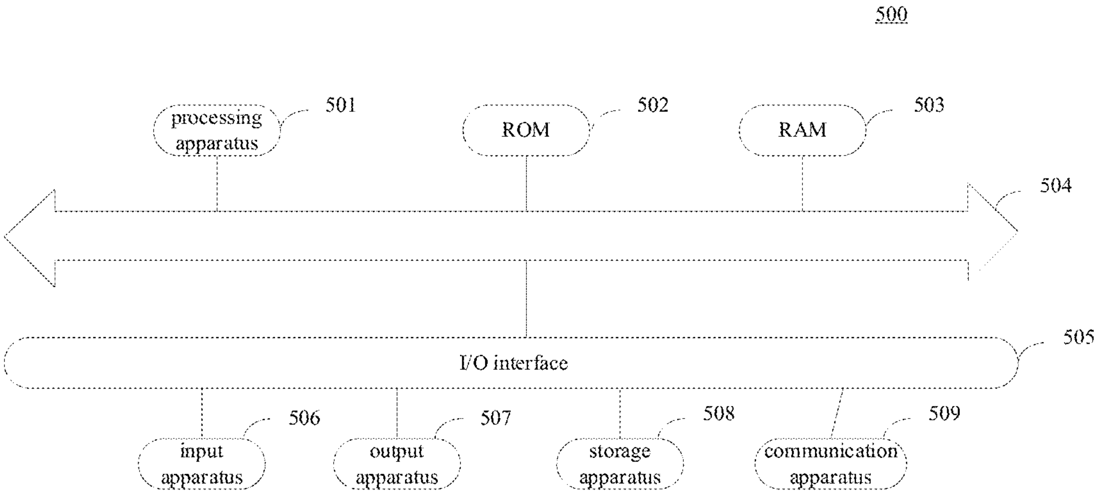
FIG. 5 is a schematic structural diagram of an electronic device in an embodiment of the present disclosure.

For example, FIG. 5 is a schematic structural diagram of a terminal device in an embodiment of the present disclosure. Referring to FIG. 5, FIG. 5 illustrates a schematic structural diagram of an electronic device 500 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and fixed terminals such as a digital TV, a desktop computer, a smart home device or the like. The electronic device illustrated in FIG. 5 is merely an example, and should not pose any limitation to the functions and the range of use of the embodiments of the present disclosure.

As illustrated in FIG. 5, the electronic device 500 may include a processing apparatus 501 (e.g., a central processing unit, a graphics processing unit, etc.), which can perform various suitable actions and processing according to a program stored in a read-only memory (ROM) 502 or a program loaded from a storage apparatus 508 into a random-access memory (RAM) 503. The RAM 503 further stores various programs and data required for operations of the electronic device 500. The processing apparatus 501, the ROM 502, and the RAM 503 are interconnected by means of a bus 504. An input/output (I/O) interface 505 is also connected to the bus 504.

Usually, the following apparatus may be connected to the I/O interface 505: an input apparatus 506 including, for example, a touch screen, a touch pad, a keyboard, a mouse, a camera, a microphone, an accelerometer, a gyroscope, or the like; an output apparatus 507 including, for example, a liquid crystal display (LCD), a loudspeaker, a vibrator, or the like; a storage apparatus 508 including, for example, a magnetic tape, a hard disk, or the like; and a communication apparatus 509. The communication apparatus 509 may allow the electronic device 500 to be in wireless or wired communication with other devices to exchange data. While FIG. 5 illustrates the electronic device 500 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 509 and installed, or may be installed from the storage apparatus 508, or may be installed from the ROM 502. When the computer program is executed by the processing apparatus 501, the above-mentioned functions defined in the method of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus, or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire three-dimensional reconstruction data of a video image and a first texture image corresponding to a current moment;

determine target brightness of a target pixel position on the first texture image corresponding to the current moment according to a pre-obtained mapping relationship between pixel positions and initial brightness and brightness change rates;

adjust brightness of the target pixel position on the first texture image to the target brightness so as to obtain a second texture image; and map the second texture image onto the video image based on the three-dimensional reconstruction data so as to obtain a target video image.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus, or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

Embodiments of the present disclosure also provide a computer-readable storage medium having a computer program stored therein which, when executed by the processor, implements a method such as the method of the above-mentioned embodiments of FIG. 1, 3, and any of FIG. 2*a*-FIG. 2*c*, which are similarly executed and beneficial effects, and which will not be repeated herein.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A video processing method, comprising:

acquiring three-dimensional reconstruction data of a video image and a first texture image corresponding to a current moment;

determining target brightness of a target pixel position on the first texture image corresponding to the current moment based on a mapping relationship in which initial brightness and a brightness change rate of each pixel position are preset, wherein the target brightness comprises a brightness value at the current moment and is changed from initial brightness at an initial moment, and the target pixel position is a pixel position where a brightness value changes over time at a preset brightness change rate;

adjusting brightness of the target pixel position on the first texture image to the target brightness so as to obtain a second texture image; and mapping the second texture image onto the video image based on the three-dimensional reconstruction data so as to obtain a target video image, wherein acquiring the first texture image corresponding to the current moment comprises randomly sampling, for the current moment, a texture on a pre-obtained reference texture image onto at least a portion of pixel positions of a preset template, wherein randomly sampling the texture on the pre-obtained reference texture image onto the at least a portion of pixel positions of the preset template comprises:

randomly selecting, for any pixel position of the at least a portion of pixel positions of the preset template, one pixel position from a pre-obtained noise texture image as a sampling position, the noise texture image comprising information of random coordinates corresponding to the sampling position, extracting the random coordinates corresponding to the sampling position from the noise texture image, and sampling a texture at a position in the reference texture image corresponding to the random coordinates onto the any pixel position.

2. The method according to claim 1, wherein the determining target brightness of the target pixel position on the first texture image corresponding to the current moment based on the mapping relationship comprises:

acquiring the initial brightness and the preset brightness change rate of the target pixel position according to the mapping relationship;

determining a brightness variation of the target pixel position corresponding to the current moment based on a time parameter at the current moment and the preset brightness change rate of the target pixel position; and determining the target brightness of the target pixel position corresponding to the current moment based on the brightness variation of the target pixel position corresponding to the current moment and the initial brightness of the target pixel position.

3. The method according to claim 1, wherein the randomly sampling the texture on the pre-obtained reference texture image onto the at least a portion of pixel positions of the preset template comprises:

performing, for any pixel position of the at least a portion of pixel positions of the preset template, coordinate offset processing on coordinates of the any pixel position on the preset template so as to obtain offset coordinates corresponding to the any pixel position;

acquiring random coordinates at a corresponding position from a preset noise texture image based on the offset coordinates; and capturing a texture at a position in the reference texture image corresponding to the random coordinates onto the any pixel position.

4. The method according to claim 1, wherein the three-dimensional reconstruction data comprises vertex coordinate information and normal direction information of a three-dimensional mesh;

the mapping the second texture image onto the video image based on the three-dimensional reconstruction data so as to obtain the target video image comprises:

performing differential processing on the three-dimensional mesh so as to obtain a fragment in the three-dimensional mesh and an offset position of the fragment in the three-dimensional mesh;

determining coordinates and a normal direction of the fragment based on the offset position and vertex coordinates and a normal direction of the three-dimensional mesh;

sampling the second texture image based on the coordinates and the normal direction of the fragment; and mapping a texture, which is sampled, onto the fragment.

5. The method according to claim 4, wherein the mapping the texture, which is sampled, onto the fragment comprises:

in a case where a distance between a normal and a first coordinate axis in a preset three-dimensional coordinate system is the shortest, mapping the texture, which is sampled, onto the fragment along a direction of the first coordinate axis.

6. An electronic device, comprising:

a processor and a memory having stored therein a computer program which, when executed by the processor, implements operations comprising:

acquiring three-dimensional reconstruction data of a video image and a first texture image corresponding to a current moment;

determining target brightness of a target pixel position on the first texture image corresponding to the current moment based on a mapping relationship in which initial brightness and a brightness change rate of each pixel position are preset, wherein the target brightness comprises a brightness value at the current moment and is changed from initial brightness at an initial moment, and the target pixel position is a pixel position where a brightness value changes over time at a preset brightness change rate;

adjusting brightness of the target pixel position on the first texture image to the target brightness so as to obtain a second texture image; and mapping the second texture image onto the video image based on the three-dimensional reconstruction data so as to obtain a target video image, wherein acquiring the first texture image corresponding to the current moment comprises randomly sampling, for the current moment, a texture on a pre-obtained reference texture image onto at least a portion of pixel positions of a preset template, wherein randomly sampling the texture on the pre-obtained reference texture image onto the at least a portion of pixel positions of the preset template comprises:

randomly selecting, for any pixel position of the at least a portion of pixel positions of the preset template, one pixel position from a pre-obtained noise texture image as a sampling position, the noise texture image comprising information of random coordinates corresponding to the sampling position, extracting the random coordinates corresponding to the sampling position from the noise texture image, and sampling a texture at a position in the reference texture image corresponding to the random coordinates onto the any pixel position.

7. The electronic device according to claim 6, wherein the determining target brightness of the target pixel position on the first texture image corresponding to the current moment based on the mapping relationship comprises:

acquiring the initial brightness and the preset brightness change rate of the target pixel position according to the mapping relationship;

determining a brightness variation of the target pixel position corresponding to the current moment based on a time parameter at the current moment and the preset brightness change rate of the target pixel position; and determining the target brightness of the target pixel position corresponding to the current moment based on the brightness variation of the target pixel position corresponding to the current moment and the initial brightness of the target pixel position.

8. The electronic device according to claim 6, wherein the randomly sampling the texture on the pre-obtained reference texture image onto the at least a portion of pixel positions of the preset template comprises:

performing, for any pixel position of the at least a portion of pixel positions of the preset template, coordinate offset processing on coordinates of the any pixel position on the preset template so as to obtain offset coordinates corresponding to the any pixel position;

acquiring random coordinates at a corresponding position from a preset noise texture image based on the offset coordinates; and capturing a texture at a position in the reference texture image corresponding to the random coordinates onto the any pixel position.

9. The electronic device according to claim 6, wherein the three-dimensional reconstruction data comprises vertex coordinate information and normal direction information of a three-dimensional mesh;

the mapping the second texture image onto the video image based on the three-dimensional reconstruction data so as to obtain the target video image comprises:

performing differential processing on the three-dimensional mesh so as to obtain a fragment in the three-dimensional mesh and an offset position of the fragment in the three-dimensional mesh;

determining coordinates and a normal direction of the fragment based on the offset position and vertex coordinates and a normal direction of the three-dimensional mesh;

sampling the second texture image based on the coordinates and the normal direction of the fragment; and mapping a texture, which is sampled, onto the fragment.

10. The electronic device according to claim 9, wherein the mapping the texture, which is sampled, onto the fragment comprises:

in a case where a distance between a normal and a first coordinate axis in a preset three-dimensional coordinate system is the shortest, mapping the texture, which is sampled, onto the fragment along a direction of the first coordinate axis.

11. A non-transitory computer-readable storage medium having stored therein a computer program which, when executed by a processor, implements operations comprising:

acquiring three-dimensional reconstruction data of a video image and a first texture image corresponding to a current moment;

determining target brightness of a target pixel position on the first texture image corresponding to the current moment based on a mapping relationship in which initial brightness and a brightness change rate of each pixel position are preset, wherein the target brightness comprises a brightness value at the current moment and is changed from initial brightness at an initial moment, and the target pixel position is a pixel position where a brightness value changes over time at a preset brightness change rate;

adjusting brightness of the target pixel position on the first texture image to the target brightness so as to obtain a second texture image; and mapping the second texture image onto the video image based on the three-dimensional reconstruction data so as to obtain a target video image, wherein acquiring the first texture image corresponding to the current moment comprises randomly sampling, for the current moment, a texture on a pre-obtained reference texture image onto at least a portion of pixel positions of a preset template, wherein randomly sampling the texture on the pre-obtained reference texture image onto the at least a portion of pixel positions of the preset template comprises:

randomly selecting, for any pixel position of the at least a portion of pixel positions of the preset template, one pixel position from a pre-obtained noise texture image as a sampling position, the noise texture image comprising information of random coordinates corresponding to the sampling position, extracting the random coordinates corresponding to the sampling position from the noise texture image, and sampling a texture at a position in the reference texture image corresponding to the random coordinates onto the any pixel position.

12. The non-transitory computer-readable storage medium according to claim 11, wherein the determining target brightness of the target pixel position on the first texture image corresponding to the current moment based on the mapping relationship comprises:

acquiring the initial brightness and the preset brightness change rate of the target pixel position according to the mapping relationship;

determining a brightness variation of the target pixel position corresponding to the current moment based on a time parameter at the current moment and the preset brightness change rate of the target pixel position; and determining the target brightness of the target pixel position corresponding to the current moment based on the brightness variation of the target pixel position corresponding to the current moment and the initial brightness of the target pixel position.

13. The non-transitory computer-readable storage medium according to claim 11, wherein the randomly sampling the texture on the pre-obtained reference texture image onto the at least a portion of pixel positions of the preset template comprises:

performing, for any pixel position of the at least a portion of pixel positions of the preset template, coordinate offset processing on coordinates of the any pixel position on the preset template so as to obtain offset coordinates corresponding to the any pixel position;

acquiring random coordinates at a corresponding position from a preset noise texture image based on the offset coordinates; and capturing a texture at a position in the reference texture image corresponding to the random coordinates onto the any pixel position.

14. The non-transitory computer-readable storage medium according to claim 11, wherein the three-dimensional reconstruction data comprises vertex coordinate information and normal direction information of a three-dimensional mesh;

the mapping the second texture image onto the video image based on the three-dimensional reconstruction data so as to obtain the target video image comprises:

performing differential processing on the three-dimensional mesh so as to obtain a fragment in the three-dimensional mesh and an offset position of the fragment in the three-dimensional mesh;

determining coordinates and a normal direction of the fragment based on the offset position and vertex coordinates and a normal direction of the three-dimensional mesh;

sampling the second texture image based on the coordinates and the normal direction of the fragment; and mapping a texture, which is sampled, onto the fragment.

15. The non-transitory computer-readable storage medium according to claim 14, wherein the mapping the texture, which is sampled, onto the fragment comprises:

in response to detecting that a distance between a normal and a first coordinate axis in a preset three-dimensional coordinate system is the shortest, mapping the texture, which is sampled, onto the fragment along a direction of the first coordinate axis.

* * * * *